(12) United States Patent
Schmidt et al.

(10) Patent No.: US 8,562,226 B2
(45) Date of Patent: Oct. 22, 2013

(54) CONNECTORS AND CABLES WITH AN OPTICAL TRANSMITTER

(75) Inventors: Mathias Schmidt, San Francisco, CA (US); Stan Rabu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 12/762,255

(22) Filed: Apr. 16, 2010

(65) Prior Publication Data

US 2011/0255827 A1 Oct. 20, 2011

(51) Int. Cl.
*G02B 6/42* (2006.01)
*H04B 10/00* (2013.01)

(52) U.S. Cl.
USPC .............................................. 385/92; 398/200

(58) Field of Classification Search
USPC .............................................. 385/92; 398/200
See application file for complete search history.

(56) References Cited

U.S. PATENT DOCUMENTS

| | | |
|---|---|---|
| 2005/0238294 A1 | 10/2005 | Nagasaka et al. |
| 2006/0263012 A1 | 11/2006 | Yamazaki |
| 2009/0030305 A1 | 1/2009 | Hoogeveen |
| 2009/0226138 A1 | 9/2009 | Kelly et al. |
| 2009/0286427 A1 | 11/2009 | Bolin |

FOREIGN PATENT DOCUMENTS

| | | |
|---|---|---|
| GB | 2167260 A | 5/1986 |
| WO | 2011130600 A2 | 10/2011 |

OTHER PUBLICATIONS

Sasaki, Shinichi et al.; An Optical Active Connector: An Optical Interconnect Module with an Electrical Connector Interface; 1996, *Electronic Components and Technology Conference*, pp. 512-519.
International Search Report for International PCT Application No. PCT/US2011/032637, mailed Apr. 17, 2012, 5 pages.
Written Opinion of the International Searching Authority for International PCT Application No. PCT/US2011/032637, mailed Oct. 16, 2012, 8 pages.
International Preliminary Report on Patentability for International PCT Application No. PCT/US2011/032637, mailed Oct. 16, 2012, 9 pages.

*Primary Examiner* — Jerry Rahll
(74) *Attorney, Agent, or Firm* — Kilpatrick Townsend & Stockton LLP

(57) ABSTRACT

Cable adapters and connectors receive electrical signals and output optical signals. A cable adapter can receive various data signals in multiple interface protocols at a first electrical connector and provide an optical signal at a second connector. The conversion of electrical signals to optical signals may be achieved at various locations in the cable adapter. A connector can include an optical transmitter for converting electrical signals into optical signals. Such a connector can be provided on an output end of a cable adapter to provide optical signals corresponding to electrical signals received at an input connector of the cable adapter.

11 Claims, 7 Drawing Sheets

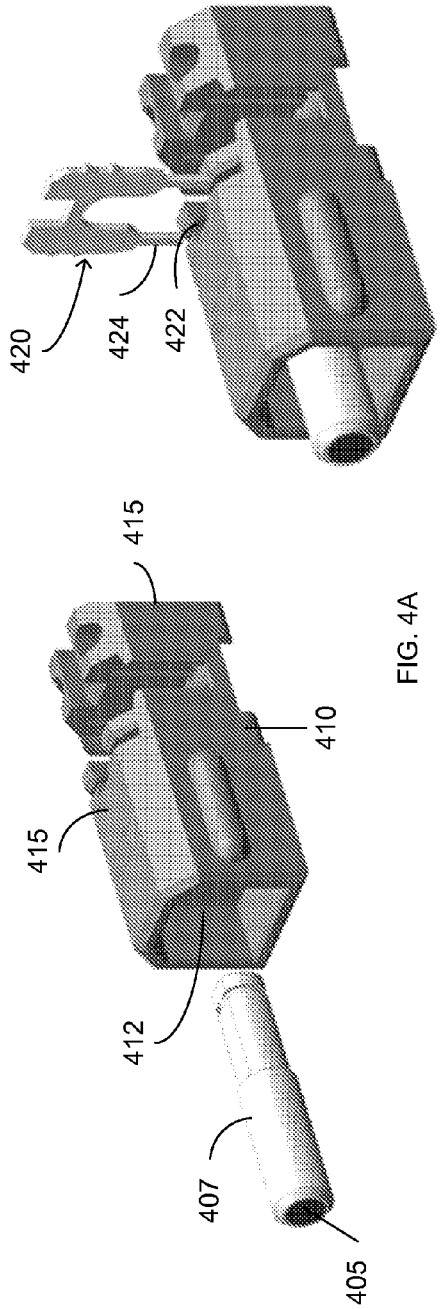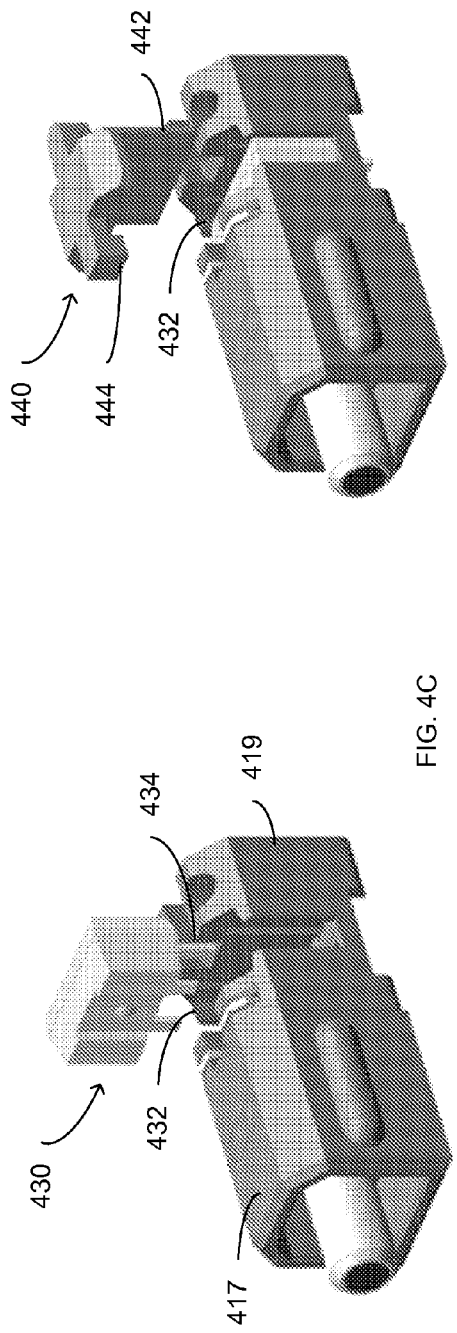

CONNECTORS AND CABLES WITH AN
OPTICAL TRANSMITTER

BACKGROUND

The present invention relates generally to connectors used to carry optical signals and in particular to the conversion of electrical signals to optical signals using connectors and cable adapters.

Optical cables can be used to convey data signals, in a similar way that electrical cables carry data signals. For example, a compact disc (CD) or a Digital Versatile Disc (DVD) player can output audio signals in the form of light, which are conveyed via an optical cable. Normal optical audio cables are purely optical. That is, they require an optical connector at both ends and an optical fiber throughout the length of the cable. Such optical audio cables are passive in that they receive light and transmit the light.

Optical cables can have certain advantages over electrical cables, but also can have disadvantages. For example, the optical cables can malfunction if they are bent. Also, an optical cable typically only receives a single pulse of light at a time. Thus, the cables can only handle one interface protocol at a time, as there is only one pulse at a time per connector. Also, many devices may not have an optical output, while others may only have an optical input. Separate devices can be used to provide such a conversion, but such devices are relatively expensive and bulky.

Therefore, it is desirable to have cable adapters and connectors that can handle multiple protocols as well as provide signals to an optical interface. It is also desirable to have low cost cables that can provide a connection from an electrical output to an optical input while maintaining a small form factor.

BRIEF SUMMARY

Accordingly, embodiments of the present invention can provide cable adapters and connectors that receive electrical signals and output optical signals. For example, a cable adapter can receive multiple interface protocols at a first electrical connector and provide an optical signal at a second connector. The cable adapters and associated connectors of embodiments can provide any one or more of the advantages of accommodating multiple input protocols, multiple output connectors having various output protocols including optical protocols, and inexpensive manufacturing. In one embodiment, a connector includes an optical transmitter for converting electrical signals to optical signals. Such a connector can be provided on an output end of a cable adapter to provide optical signals corresponding to electrical signals received at an input connector of the cable adapter.

According to an embodiment, a male plug connector has an optical transmitter and a housing that fits into a corresponding optical female connector. The optical transmitter lies within the housing and is configured to convert electrical signals into optical signals to be received by the corresponding optical female connector.

According to another embodiment, a cable adapter has a first connector that receives electrical signals, a cable that carries the electrical signals, and a second connector that converts the electrical signals to optical signals. The second connector includes a housing configured to mate with a corresponding optical connector, an optical transmitter that converts electrical signals into optical signals, and a light guide that carries the optical signals to the corresponding optical connector.

According to another embodiment, a method of manufacturing a connector that receives electrical signals and outputs optical signals is provided. A light guide is inserted into a front opening of a housing of the connector. The housing has one or more outer walls that define the front opening. An active optical component is inserted through a top opening in at least one of the outer walls of the housing. The light guide is aligned with the active optical component.

According to another embodiment, a connector has a housing configured to mate with a corresponding optical connector, an active optical component, and a locking piece. The active optical component lies within the housing between a front portion of the housing and a back portion of the housing. The front portion is separated from the back portion by an opening in at least one wall of the housing. The active optical component is configured to receive electrical signals and transmit optical signals corresponding to the received electrical signals. The locking piece fits into the opening over the active optical component, and locks with the front portion of the housing and with the back portion of the housing.

A better understanding of the nature and advantages of the present invention may be gained with reference to the following detailed description and the accompanying drawings.

BRIEF DESCRIPTION OF THE DRAWINGS

FIGS. 4A-4L depict an optical connector at different stages of assembly process of FIG. 3 according to embodiments of the present invention.

DETAILED DESCRIPTION

Certain embodiments can provide cable adapters and connectors that receive electrical signals and output optical signals. For example, a cable adapter can receive multiple interface protocols at a first electrical connector and provide an optical signal at a second connector. Thus, embodiments are not restricted to a single interface protocol, and can output optical signals. In one embodiment, a connector includes an optical transmitter for converting electrical signals to optical signals. Such a connector can be provided on an output end of a cable adapter to provide optical signals corresponding to electrical signals received at an input connector.

In some embodiments, using a connector with an optical transmitter allows conductive wires (e.g. made of copper) to be used throughout the length of a cable assembly. The conductive wires allow for more complicated splitter-style cable designs. In one embodiment, the connector is a male plug connector designed per the SPDIF (Sony/Philips Digital Interconnect Format)/Toslink structural specifications. Such a male plug connector can be mated with any standard stereo system with an optical audio input.

Figure 1:
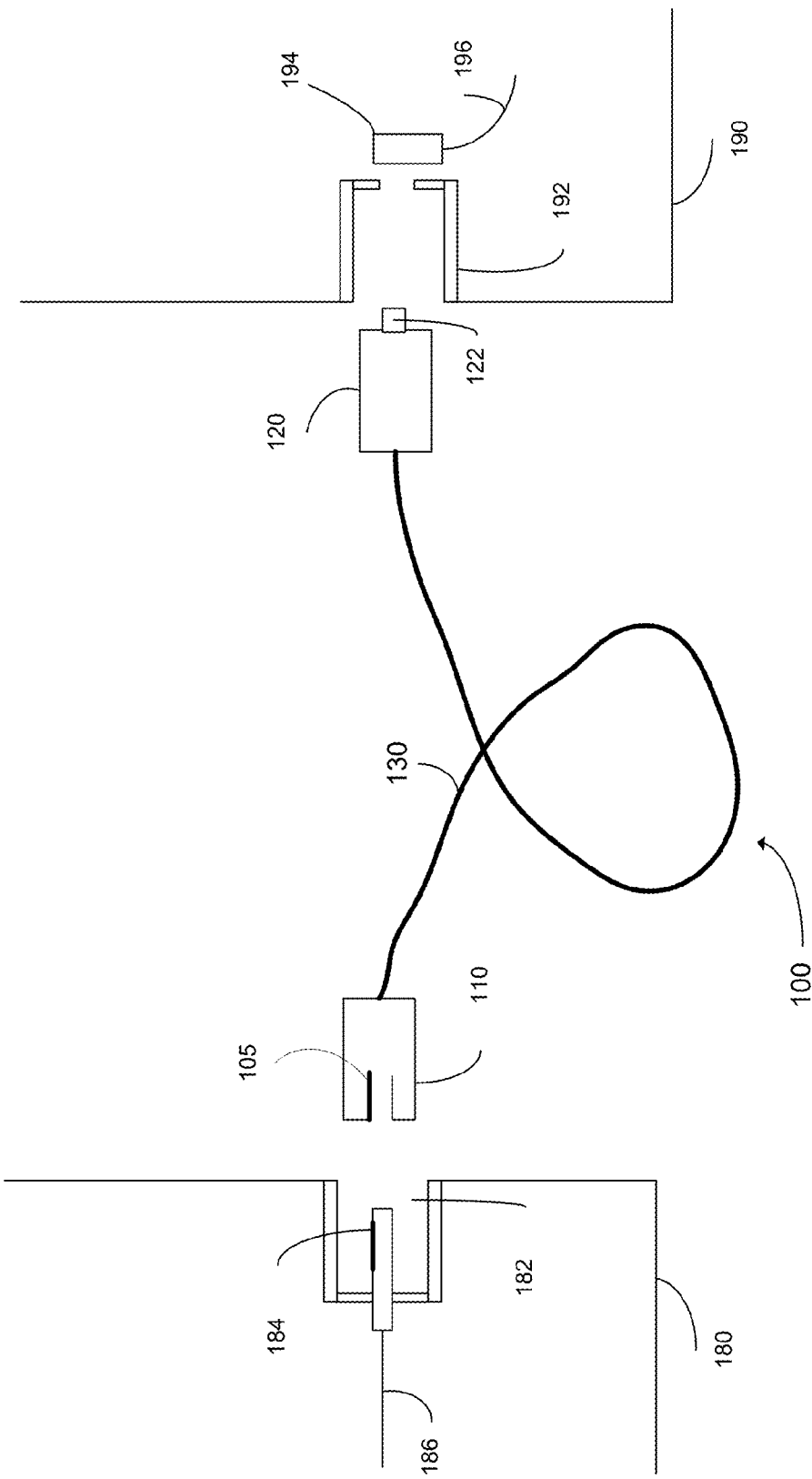
FIG. 1 shows a cable adapter that receives an electrical signal and outputs a corresponding optical signal according to embodiments of the present invention.

FIG. 1 shows a cable adapter 100 that receives an electrical signal and outputs a corresponding optical signal according to embodiments of the present invention. Cable adapter 100 receives electrical signals from sending device 180, converts the electrical signals into optical signals, and provides the optical signals to receiving device 190. Sending device 180 can provide one or more output electrical signals from electrical line(s) 186 through electrical contacts 184 of electrical connector 182. The electrical connectors and electrical contacts described herein can have any suitable form factor and number of contacts.

Cable adapter 100 receives the one or more electrical signals at electrical contacts 105 of electrical connector 110. As shown, the electrical connector 182 is a female receptacle connector that corresponds to the electrical connector 110. The electrical signals are conveyed from electrical connector 110 to optical connector 120 via cable 130.

Optical connector 120 provides optical signals through light guide 122 to optical connector 192 of the receiving device. Light guide 122 can be any suitable device that can carry light, e.g. a solid tube-like structure of glass or plastic or a hollow tube-like structure where the inner wall of the light guide reflect at least some light. As shown, the electrical connector 192 is a female receptacle connector that corresponds to the optical connector 120. In other embodiments, light guide 122 may fit into an inner tube of a corresponding optical connector, where an outer surface of the corresponding optical connector can fit into an opening in a housing of optical connector 120. Such embodiments provide for optical connectors that have both male and female aspects.

Receiving device 190 can use an optical to electrical converter 194 to convert the optical signals received from optical connector 120 into electrical signals on line 196. Any type of signal (e.g. audio or video) could be conveyed with cable adapter 100. Although, connectors 110 and 120 are shown as male connectors, female connectors also could be used.

In some embodiments, optical connector 120 includes an optical transmitter that converts electrical signals into optical signals. In these embodiments, cable 130 includes conductive wires (e.g. made of copper) that are electrically coupled with electrical contacts 105 and that carry electrical signals received at electrical contacts 105. In one embodiment, cable 130 with conductive wires is flexible with a length of about one to three meters, and may have a plastic or rubberized coating. In one aspect, conductive wires of cable 130 can be bent without degrading the signal from electrical connector 110 to optical connector 120. In another embodiment, optical connector 120 can include, instead of or in addition to the optical transmitter, an optical receiver that converts received optical signals into electrical signals, which are then transmitted to electrical connector 110 via cable 130. The optical transmitter and optical receiver may be two separate units or one single unit (e.g., called a transceiver).

In other embodiments, electrical connector 110 includes an optical transmitter that converts electrical signals into optical signals. In these embodiments, cable 130 includes optical fiber for carrying optical signals from electrical connector 110 to optical connector 120. In one aspect, electrical connector 110 can include (instead of or in addition to the optical transmitter) an optical receiver that converts received optical signals (i.e. received via cable 130) into electrical signals, which are then transmitted to electrical connector 182. The optical transmitter and optical receiver may be two separate units or one single unit (e.g., called a transceiver).

Figure 2:
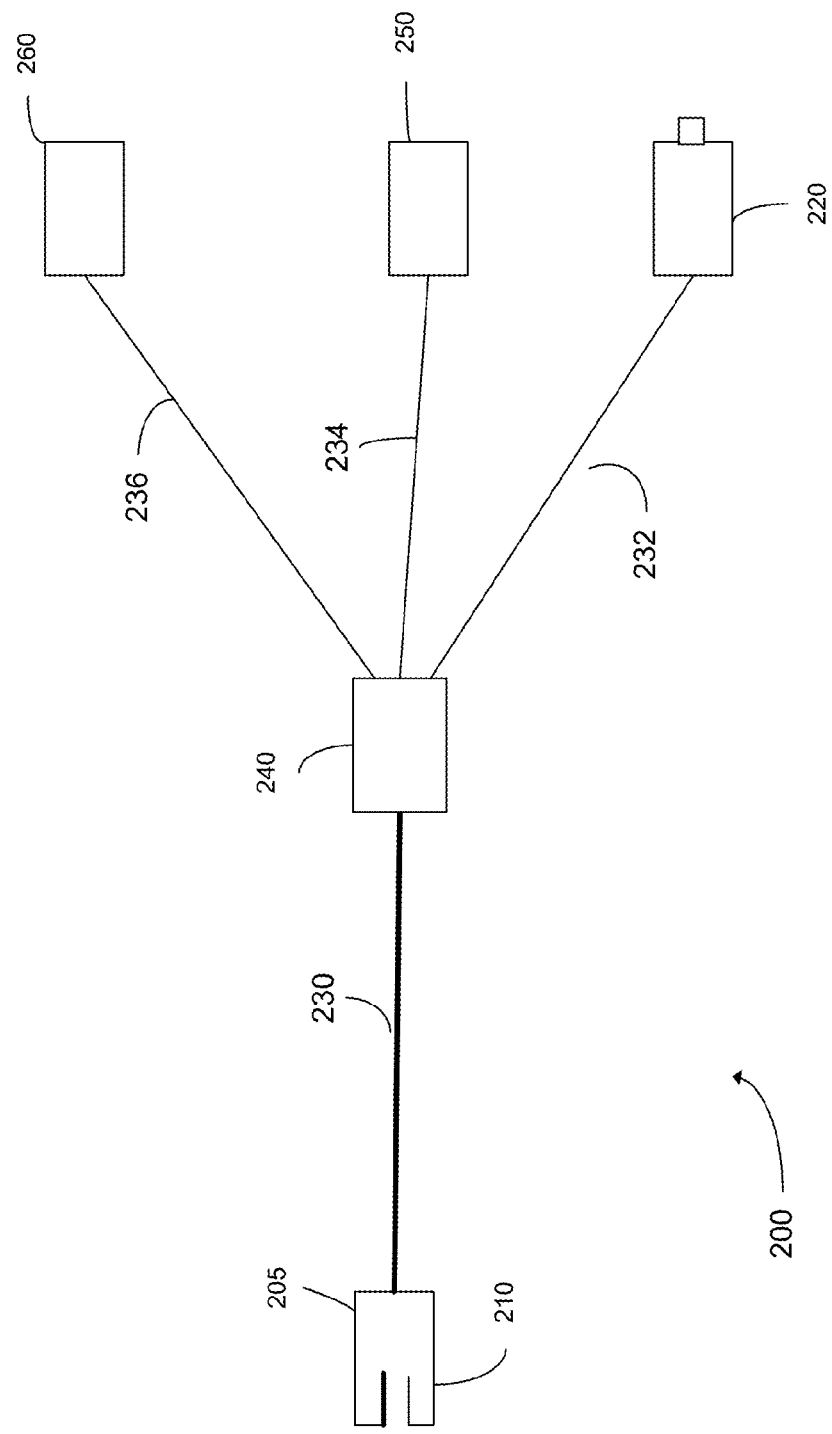
FIG. 2 shows a cable adapter that can receive multiple electrical signals and outputs corresponding electrical and optical signals according to embodiments of the present invention.

FIG. 2 shows a cable adapter 200 that can receive multiple electrical signals and outputs corresponding electrical and optical signals according to embodiments of the present invention. Cable adapter 200 has the ability to receive electrical signals in multiple data formats, e.g. Universal Serial Bus (USB), High-Definition Multimedia Interface (HDMI), and digital audio signals. In one embodiment, electrical contacts 205 of electrical connector 210 have different contacts designated for each of the formats.

In some embodiments, electrical contacts 205 lie in a single row. The contacts designated for a particular format may be grouped together or they may lie in contact locations that are separated from each other by contacts for other purposes (e.g. ground, power, or for signals of other formats).

As an example, electrical connector 210 can have 30 contacts. Thus, cable 230 may have 30 conductive wires, one electrically coupled with each of the contacts. In various embodiments, four of the contacts can be used for USB, 19 contacts can be used for HDMI, and three wires for S/PDIF (2 for differential signal and one for power for transmitter). Electrical contacts 105 can be electrical contacts that can carry digital or electrical signals, e.g. as described in U.S. patent publication 2004/224638.

As electrical connector 210 can carry multiple data formats (interface protocols), it is desirable for cable adapter 200 to have a different second connector for each data format. Thus, cable adapter 200 has multiple connectors at opposite ends from electrical connector 210. In one embodiment, cable adapter 200 includes an HDMI connector 260, a USB connector 250, and an optical connector 220 (e.g. a SPDIF or Toslink connector).

In one embodiment, a splitter 240 is used to separate the conductive wires of cable 230. Splitter may simply be a housing for separating the wires into separate cables (each having its own covering), and does not contain electrical components. In another embodiment, cable 230 could have separate coating over different section of wires, and thus a splitter 240 is not used, as the separate sections could just be separated. Each opposite connector may be coupled with different conductive wires of cable 230. For example, cable 236 may include conductive wires that are extensions of the conductive wires in cable 230 that carry the HDMI signals. Or, the wires in cable 236 may be electrically coupled to the conductive wires in cable 230 that carry the HDMI signals through another medium (e.g. a circuit board).

In one embodiment, splitter 240 can include an optical transmitter for converting electrical signals into optical signals. In this embodiment, cable 232 includes optical fiber for carrying optical signals from splitter 240 to optical connector 220. Also, splitter 240 may have an output optical connector to which a connector of cable 232 could connect. Thus, cable 232 could be a separate optical cable that passively carries the optical signals from splitter 240 to a receiving device.

However, an optical cable can be hard to manufacture, particularly if there are also electrical wires. Such construction could be more costly as typically the wires (with signals destined to be converted to optical signals) would be cut and terminated at splitter 240, and electrical devices added to splitter 240.

In another embodiment, optical connector includes an optical transmitter for converting electrical signals (e.g., digital audio or video signals) into optical signals. In this embodiment, cable 232 can be extensions of the conductive wires in cable 230 that carry the digital audio or video signals. Thus, cable 230 with cables 232, 234, and 236 can be made as an all electric cable, which can have continuous wires and be made in a single low cost process. For example, individual conductors for the wires can be on a spool, with the conductors going through a wrap to combine the conductors into one cable.

Figure 3:
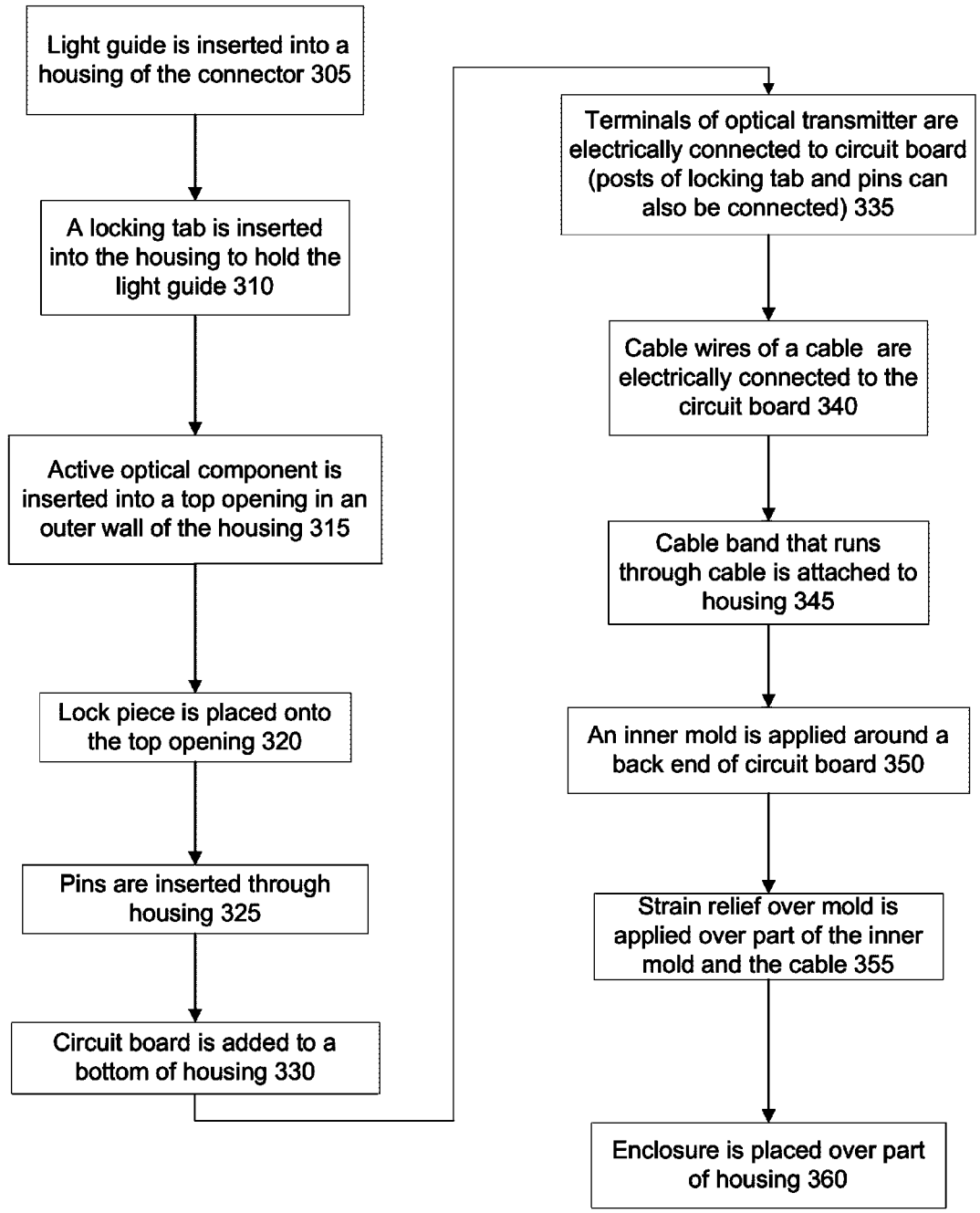
FIG. 3 is a flowchart illustrating an assembly process for making a connector having an active optical component according to embodiments of the present invention.

FIG. 3 is a flowchart illustrating an assembly process 300 for making a connector having an active optical component according to embodiments of the present invention. In various embodiments, the active optical component can be an optical transmitter, an optical receiver, or an optical transceiver that includes both an optical transmitter and an optical receiver in a single component. FIGS. 4A-4L show a connector at different stages of assembly process 300. Certain parts of assembly process 300 may be occur in a different order than presented, while other parts do occur prior to other parts, as will be easily recognizable by one skilled in the art.

At block 305, a light guide is inserted into a housing of the connector. FIG. 4A shows light guide 405 (e.g. a solid or hollow structure made of plastic or glass) being inserted into a front opening 412 of housing 410. In one embodiment, front opening 412 has a height and a width of about 6 mm to a side. The height and width dimension of front opening 412 can persist through the length of housing 410. The front opening may be square (as shown), circular, or other suitable shape. Housing 410 can also include additional openings on outer walls. In another embodiment, housing 410 is a single piece of insulating material (e.g. plastic).

In some embodiments, light guide 405 is coated, e.g., with metal. Such a construction can allow a separate subcomponent assembly. In one embodiment, the light guide (e.g. plastic) is inserted into a metal sleeve 407 (e.g. made of brass with nickel plating), or other cover. The light guide can then be cut at the ends of the sleeve and/or melted at the end. The ends of the light guide can then be polished.

At block 310, a locking tab 420 (or other type of suitable locking member) is inserted into housing 410 through a slot opening 422 in an outer wall of housing 410, as shown in FIG. 4B. As shown, slot opening 422 is on a top outer wall of housing 410, and locking tab includes posts 422. In other embodiments, slot opening 422 may be on side outer walls or a bottom outer wall of housing 410. Locking tab 420 can hold light guide 405 in place. In one embodiment, locking tab 420 can engage notches in a cover (e.g., metal sleeve 407) over light guide 405.

At block 315, an optical transmitter 430 or other active optical component is inserted into a top opening 432 in an outer wall of the housing 410, as shown in FIG. 4C. Top opening 432 can separate housing 410 into a front portion 417 and a back portion 419. Optical transmitter 430 is shown having three terminals 434. In one embodiment, the three terminals are inputs, where one is for power and two are for a differential electrical signal that is converted into the optical signal. In another embodiment, optical transmitter 430 is as wide as housing 410. In one aspect, locking tab 420 fixes light guide 405 in place so that an air gap between optical transmitter 430 and light guide 405 is not too large (e.g. less than 2 mm).

At block 320, a lock piece 440 is placed onto top opening 432, as shown in FIG. 4D. Lock piece may be made of plastic or other suitable material. In one aspect, lock piece 40 fixes optical transmitter 430 in place. A flat lower section 442 of lock piece 440 can fit into top opening 432 in back of optical transmitter 430 to keep it from moving back and forth so that the air gap between light guide 405 and optical transmitter 430 stays within a tolerance. In one embodiment, the lower section 442 can be wedged between an inner wall of housing 410 and the back of optical transmitter 430.

In one embodiment, lock piece 440 includes locking elements 444 that fit into pockets on a top surface of housing 410. In one aspect, locking elements 444 snap into place. Optical transmitter 430 can be free until the plastic lock is snapped in. Once locked into housing 410, lock piece 440 keep optical transmitter 430 in place. Lock piece 440 can also help keep locking tab 420 in place. Lock piece 440 can also gives structural integrity to housing 410, which otherwise might only have a thin connection between front portion 417 and back portion 419. Thus, lock piece 440 can act as a second load path for longitudinal stress on housing 410.

Figure 4F:
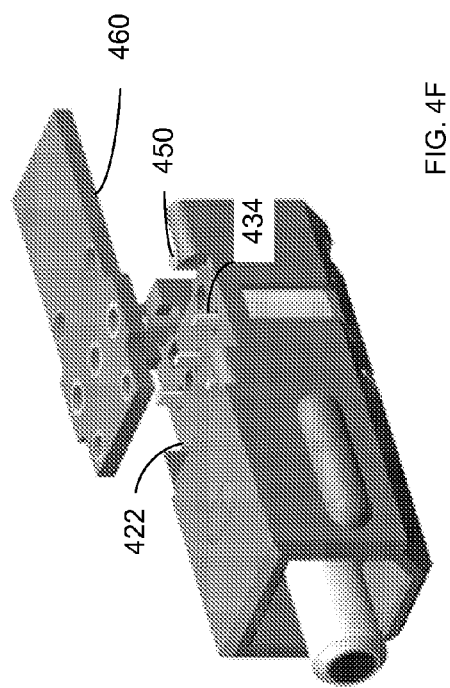
Figure 4E:
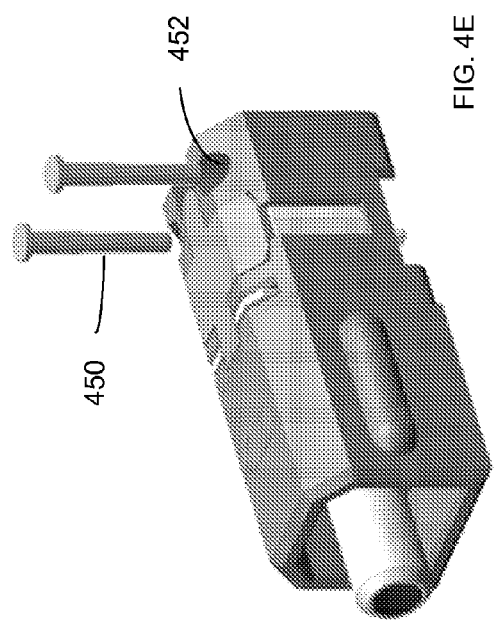

At block 325, one or more pins 450 are inserted through housing 410, as shown in FIG. 4E. In one embodiment, pins are stress fit into housing 410 through top holes 452.

At block 330, a circuit board 460 is added to a bottom of housing 410, as shown in FIG. 4F. In one embodiment, circuit board 460 is a printed circuit board (PCB). As shown, circuit board 460 includes holes for posts 422 of locking piece 420, terminals 434 of optical transmitter 430, and pins 450. In another embodiment, circuit board 460 can have a bypass cap and termination resistors to reduce ringing from the electrical signals. When the electrical signals are a square wave (e.g. 0 volts to 1 or 2 volts), the electrical signals can have overshoot, which can be reduced by circuitry on the circuit board before the signals reach optical transmitter 430.

Figure 4H:
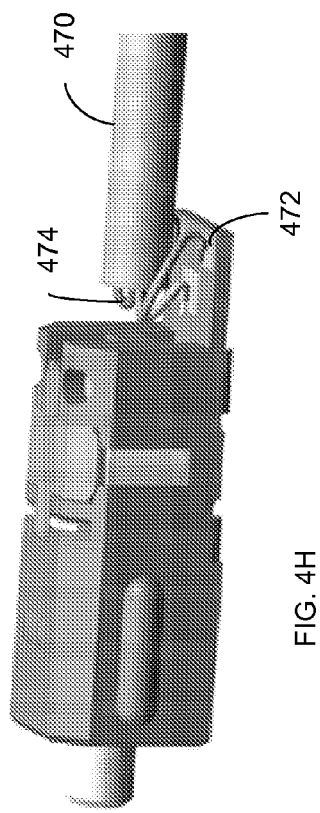
Figure 4G:
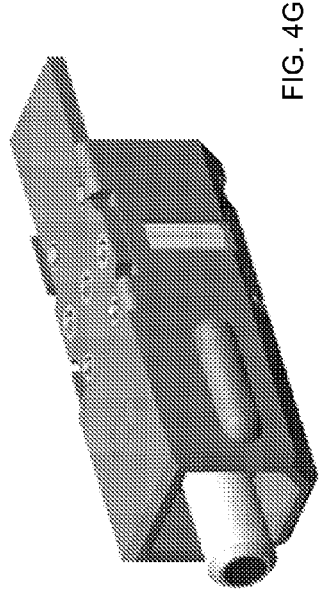

At block 335, terminals 434 of optical transmitter 430 are electrically connected (e.g. soldered) to circuit board 460, as shown in FIG. 4G. In one embodiment, terminals 434 are soldered to edges of holes of circuit board 460, where the edges include a conductive materials. Posts 422 of locking piece 420 and solder pins 450 can be bonded (e.g. also soldered or attached with an adhesive material) to circuit board 460. In one embodiment, the soldering is performed by hand.

Having circuit board 460 connected in front (to posts 422) of terminals 434 and in back (to pins 450) of terminals 434 can add strength (e.g. by forming a rigid box) to circuit board 460. Also, such connections can keep the electrically active connection to terminals 434 from breaking as forces will likely be absorbed by the connections to posts 422 and pins 450. Thus, in case circuit board 460 is stressed, stressed solder joints that are not critical, i.e. not being used for an electrical connection, can bear the brunt of the stress.

At this point, the connector is a self-contained unit, which adds a benefit over putting the transmitter in a splitter, which is part of the cable assembly. Thus, this connector can be added to any device in this form.

At block 340, cable wires 474 of cable 470 are electrically connected to circuit board 460, as shown in FIG. 4H. In the embodiment shown, three cable wires (1 for power and 2 data) are soldered to respective solder pads 472 of circuit board 460. In one embodiment, the soldering is performed by hand. In an embodiment, a cable manufacturer may receive the connector completed at block 335, and the cable manufacturer may perform block 340 and on.

Figure 4J:
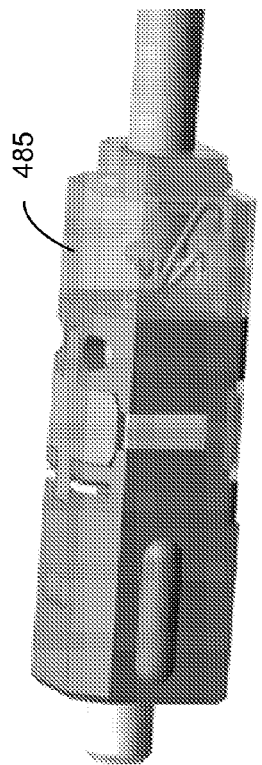
Figure 4L:
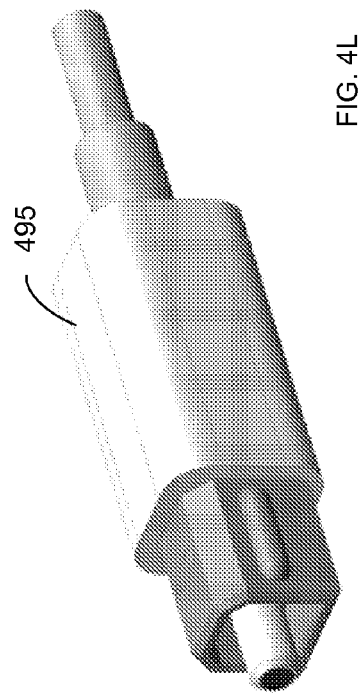
Figure 4I:
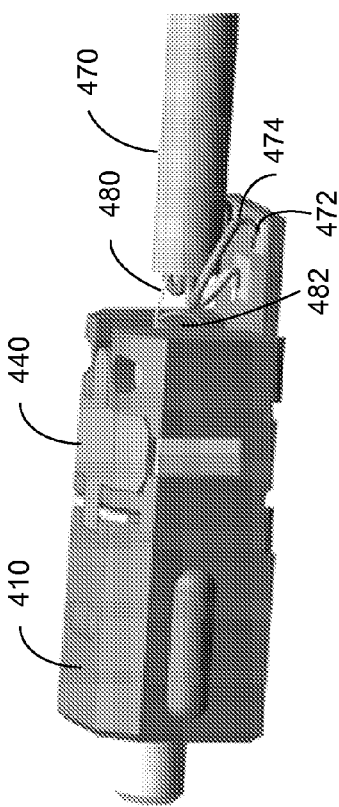

At block 345, a cable band 480 that runs through cable 470 is attached to housing 410, as shown in FIG. 4I. Cable band 480 may be made of Kevlar or other suitably strong material. In one embodiment, cable band 480 is tied around a bar 482 at the back end of housing 410. Thus, when cable 470 is pulled, the connections of the wires 474 on solder pads 472 are not broken by wires 474 being pulled. Additionally, when cable 470 is pulled, the load is carried through housing 410 and lock piece 440. Also, if a force pulls on the front of the connector, the load and can be carried in a similar manner.

At block 350, an inner mold 485 is applied around a back end of circuit board 460, as shown in FIG. 4J. In one embodiment, inner mold 485 is polyethylene or other suitable material. In another embodiment, inner mold 485 is applied in a vertical inner mold machine using relatively low pressure compared to plastics molding for the housing. Inner mold 485 can provide rigidity to wires 474 at the end of cable 470.

Figure 4K:
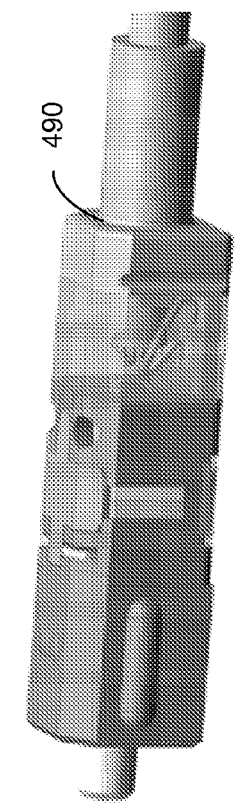

At block 355, a strain relief over mold 490 is applied over part of inner mold 485 and cable 470, as shown in FIG. 4K. Over mold 490 can prevent damage to cable 470 inside or near inner mold 485. For example, stresses from conical or side-to-side motion can be reduced to prevent damage.

At block 360, an enclosure 495 is placed over part of housing 410, as shown in FIG. 4L. In one embodiment, an enclosure 495 is already over cable 470, and it is just slid around over mold 490 and part of housing 410. As housing 410 may have a same width and height throughout its length, enclosure 495 can be easily slid over housing 410. In another embodiment, enclosure 495 can be glued to housing 410.

Figure 5:
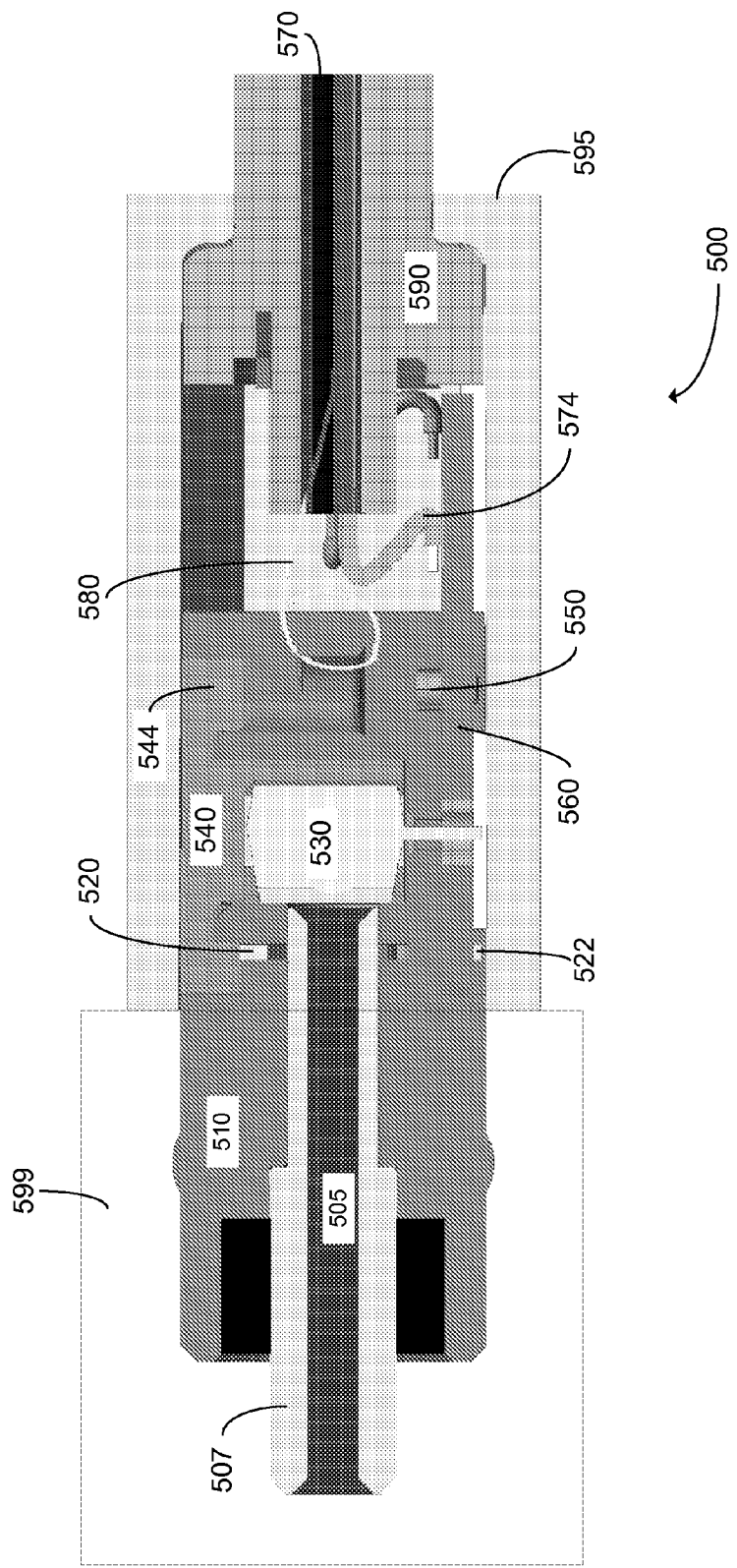
FIG. 5 shows a cross-sectional side view of male optical connector that includes an optical transmitter according to embodiments of the present invention.

FIG. 5 shows a cross-sectional side view of male optical connector 500 that includes an optical transmitter 530 according to embodiments of the present invention. Male optical connector 500 is shown mated with a female receptacle connector 599, e.g. optical connector 192 of receiving device 190, as shown in FIG. 1. In one embodiment, as part of mating, a housing 510 of male optical connector 500 can fit partially or completely inside of female receptacle connector 599.

As drawn, the electrical signals enter from the right through cable 570 and generally travel to the left. For an active optical element that includes an optical receiver, the electrical signals would generally travel to the right, as drawn. The electrical signals can travel on wires 574, which are soldered to circuit board 560. Circuit board 560 has conductive traces that carry the electrical signals from wires 574 to optical transmitter 530. The electrical signals may include power for powering optical transmitter 530 and data signals (e.g. a differential signal). Optical transmitter 530 converts the electrical signals into optical signals. The optical signals can be transmitted to a light guide 505, which carries the optical signals to receptacle connector 599. In various embodiments, light guide 505 can extend past a front edge of housing 510, just to the front edge, or stop before the front edge (e.g. if the female connector has a light guide that fits into housing 510).

Locking tab 520 can be attached to a metal sleeve 507 that surrounds light guide 505 to keep light guide 505 aligned with and within a specified distance of optical transmitter 530. Posts 522 of locking tab 520 can be bonded (e.g., soldered) to circuit board 560. One or more pins 550 can be disposed vertically through housing 510 and can also be bonded to circuit board 560. These additional connections from components that are structurally connected with housing 510 to circuit board 560 can help reduce movement of circuit board 560 that might damage the active solder connection of optical transmitter 530 to circuit board 560.

A cable band 580 (e.g. made of Kevlar) runs through cable 570 and is attached (e.g. tied) to housing 510, in order to provide stress relief to the solder connections of wires 574. A lock piece 540 can carry at least part of the load from a force on cable band 580, which may result from cable 570 being pulled. For example, lock piece 540 has locking elements 544 that fit into pockets on housing 510. Thus, when a force occurs along the length of housing 510 lock piece 540 can convey the force along with a bottom part of housing 510.

The opening in housing 510, in which lock piece 540 is put, may be used for insertion of optical transmitter 530. An over mold 590 can also provide stress relief to wires 574. An enclosure 595 can surround part of over mold 590 and part of housing 510.

Embodiments described herein provide connectors and cable adapters for accommodating electrical and optical signals. In some embodiments, a connector includes an optical transmitter for converting electrical signals to optical signals. For example, a first connector of a cable adapter can receive electrical signals, which may correspond to multiple data formats. The cable adapter can then transmit the electrical signals to multiple second connectors, of which at least one second connector can convert the electrical signals to optical signals. Such a cable adapter can provide a low cost and compact solution for providing communication from a sending device to multiple receiving devices, where one of the receiving devices receives optical signals.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A male plug connector comprising:
 a housing configured to at least partially fit inside a corresponding optical female connector;
 an optical transmitter within the housing, the optical transmitter configured to:
 receive electrical signals; and
 transmit optical signals corresponding to the received electrical signals, the optical signals to be received by the corresponding optical female connector;
 a circuit board to which the optical transmitter is electrically connected, wherein the circuit board receives the electrical signals and conveys the electrical signals to the optical transmitter; and
 a light guide extending from within the housing to outside of the housing, wherein the light guide is configured to receive the optical signals and to carry the optical signals to the corresponding optical female connector.

2. The male plug connector of claim 1, wherein the housing is a single piece of insulating material.

3. The male plug connector of claim 1, wherein the housing has approximately a same width and height along an entire length of the housing.

4. The male plug connector of claim 1, further comprising:
 a cover around the light guide; and
 a locking member disposed through a slot opening in the housing, the locking member holding the cover such that the light guide is in alignment with the optical transmitter.

5. The male plug connector of claim 4, further comprising:
 one or more pins disposed through the housing in a same orientation as the locking member, the one or more pins located between the optical transmitter and a back end of the housing,
 wherein the locking member and the one or more pins are bonded to the circuit board.

6. The male plug connector of claim 1, wherein the housing has an opening above the transmitter, and wherein the male plug connector further comprises:
 a lock piece disposed over the optical transmitter and at least partially filling the opening.

7. The male plug connector of claim 6, wherein the lock piece has a flat lower section that fits between a back of the optical transmitter and an inner wall of the housing.

8. A connector comprising:
 a housing configured to mate with a corresponding optical connector;

an active optical component within the housing, the active optical component between a front portion of the housing and a back portion of the housing, wherein the front portion is separated from the back portion by an opening in at least one wall of the housing; and a locking piece fitted into the opening over the active optical component, wherein the lock piece locks with the front portion of the housing and with the back portion of the housing.

9. The connector of claim 8, wherein the active optical component is configured to receive electrical signals and transmit optical signals corresponding to the received electrical signals, the connector further comprising:

a light guide assembly for carrying the optical signals from the active optical component to the corresponding optical connector.

10. The connector of claim 9, further comprising:

a locking member that engages the light guide assembly, the locking member disposed in a slot in a same wall that the opening exists, wherein the locking member aligns the light guide with the active optical component.

11. The connector of claim 10, further comprising:

a circuit board, wherein the circuit board has traces electrically coupled with terminals of the active optical component, and wherein the circuit board is bonded to posts of the locking member; and one or more pins disposed through the back portion of the housing, wherein the one or more pins are bonded to the circuit board.

* * * * *